Oct. 26, 1948.　　　　　E. R. MOSSAK　　　　　2,452,387
PLOWSHARE
Filed Oct. 22, 1945
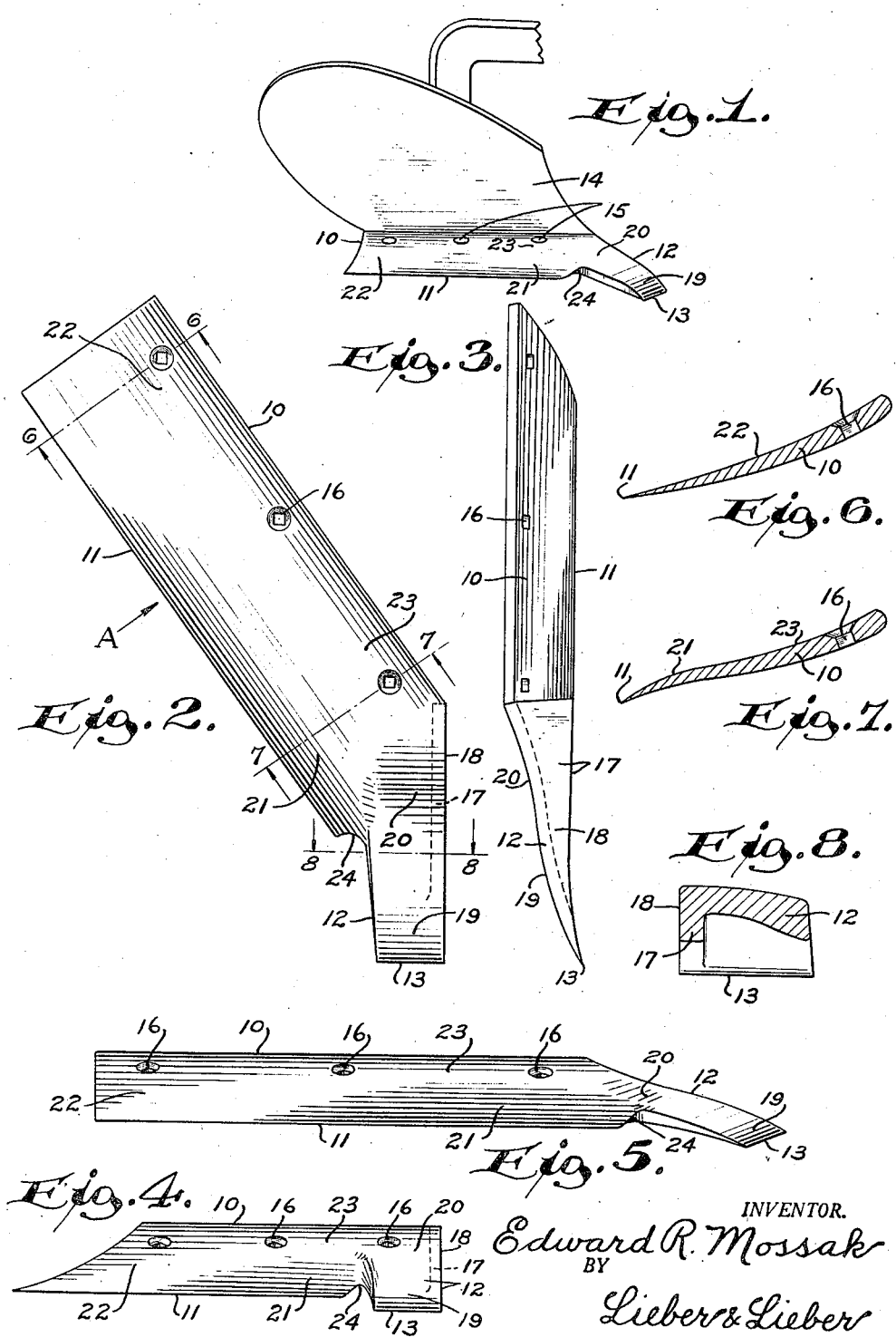
INVENTOR.
Edward R. Mossak
BY
Lieber & Lieber
ATTORNEYS Patented Oct. 26, 1948

2,452,387

UNITED STATES PATENT OFFICE 2,452,387

PLOWSHARE

Edward R. Mossak, Milwaukee, Wis.

Application October 22, 1945, Serial No. 623,724

3 Claims. (Cl. 97—125)

The present invention relates in general to improvements in the art of land tillage, and relates more specifically to improvements in the construction and operation of plows and plowshares for mouldboards.

The primary object of my invention is to provide an improved plowshare for mouldboards, which besides being simple and durable in construction, is also highly efficient in use.

While it has heretofore been proposed to provide mouldboard plowshares each having a cutting point closely adjacent to the land side of the share and adapted to proceed along the furrow in advance of an outwardly inclined rear cutting blade, these prior devices have not proven satisfactory for use in all types of soil and especially when applied to hard and stony earth. In all of these prior plowshare structures, there is a pronounced tendency for the leading point to work out of such ground rather than to embed itself therein, due primarily to the facts that the point is not only provided with a leading cutting edge but does actually cut along one or both sides as well, and that the blade adjoining the point is not properly formed so as to assist the latter to remain embedded within the soil. The prior plowshare assemblages of this kind have not therefore been suitable and entirely satisfactory for plowing hard and stony soil.

It is therefore a more specific object of my present invention to provide a new and useful plowshare especially applicable to mouldboards, which may be utilized to most effectively plow diverse types of soil and particularly hard and stony land.

Another specific object of this invention is to provide an improved mouldboard plowshare of the type having a leading point and an integral trailing blade, wherein the parts are formed to properly cooperate in order to most effectively retain the point and blade cutting edges within the soil.

A further specific object of the invention is to provide an improved plowshare which is effectively cooperable with a mouldboard to which it may be removably attached, in order to properly roll the tilled soil so as to produce neat and regular successive furrows.

Still another specific object of my invention is to provide an improved plowshare for mouldboards, which is exceedingly strong and rugged, and the cutting edges of which may be readily re-sharpened to insure most efficient functioning of the device.

These and other specific objects and advantages of the invention will be apparent from the following detailed description.

A clear conception of the features constituting my present improvement, and of the construction and operation of a typical plowshare embodying the invention may be had by referring to the drawing accompanying and forming a part of this specification wherein like reference characters designate the same or similar parts in the various views.

Fig. 1 is a perspective view of a typical mouldboard and plowshare combination embodying the present improvement;

Fig. 2 is a somewhat enlarged top view of one of the improved plowshares;

Fig. 3 is a likewise enlarged side view of the plowshare looking toward the land side thereof;

Fig. 4 is a similarly enlarged front view of the plowshare viewed in line with the point;

Fig. 5 is an elevation of the plowshare looking in the direction of the arrow A in Fig. 2;

Fig. 6 is a further enlarged transverse section through the trailing end of the plowshare blade, taken along the line 6—6 of Fig. 2;

Fig. 7 is a likewise enlarged transverse section through the advancing end of the plowshare blade, taken along the line 7—7 of Fig. 2; and Fig. 8 is a similarly enlarged transverse section through the plowshare point, taken along the line 8—8 of Fig. 2.

While the invention has been shown and described herein as being especially applicable to plowshares adapted to be detachably associated with mouldboards, it is not my desire or intent to thereby unnecessarily limit the scope or utility of the improvement.

Referring to the drawing, the improved plowshare comprises in general an elongated flat blade 10 having a rectilinear lower cutting edge 11 and a point 12 also having a straight lower forward cutting edge 13 and being formed integral with the blade 10, the unitary plowshare thus produced being adapted for rigid attachment to an ordinary mouldboard 14 with the aid of several bolts 15 coacting with openings 16 in the blade 10, Fig. 1. The unitary plowshare is preferably formed of durable metal such as steel, by forging or otherwise, and may be of any desired size in order to properly cooperate with mouldboards 14 of various dimensions.

In accordance with my invention, the leading point 12 is provided with an integral flange 17 having a flat or approximately plane outer surface 18 adapted to follow the land side of each furrow produced by the plowshare, and the front cutting edge 13 is disposed somewhat below the plane of the inclined blade edge 11 and is perpendicular to the surface 18, being the only cutting edge provided on the point 12. The upper surface 19 of the point 12 is convex near the edge 13 but blends into a concave surface portion 20 remote from this edge, and this concave portion 20 sweeps laterally and blends with the adjacent surface portions of the blade 10 and mouldboards 14. It is important that the cutting edge 13 of the point 12 be disposed below the blade edge 11 and that the surface 19 adjoining this edge be convex while the lower surface near the cutting edge is concave; and it is also of equal importance that the surface 18 be approximately plane and that the point 12 be devoid of side cutting edges so that this point may in fact act as a groove cutting chisel while advancing through hard and stony ground.

The elongated rectilinear cutting blade 10 which is formed integral with the point 12, extends at an oblique angle rearwardly and outwardly away from the surface 18, and in order to assist in maintaining the point edge 13 embedded in the soil, the front portion of the blade 10 adjoining its cutting edge 11 is provided with an upper convex surface portion 21 and with a concave surface therebeneath, as clearly illustrated in Fig. 7. However, in order to finally properly assist the mouldboard 14 in turning or rolling the removed earth, the rear portion of the blade 10 adjoining the cutting edge 11 is provided with an upper concave surface portion 22 as depicted in Fig. 6, and the surfaces 21, 22 gradually blend into each other near the mid-portion of the blade 10 so as to maintain the edge 11 rectilinear and in approximately a horizontal plane when the plowshare is in actual use. The upper surface portion 23 of the blade 10 above the convex portion 21, is concave and blends smoothly with the adjacent surfaces 20, 21, 22; and the cutting blade edge 11 terminates at its forward end in a recess 24 adjoining the furrow side of the point 12 in order to facilitate re-sharpening of the edge 11 when dull. The formation of the concave surfaces 20, 22, 23 should be such that they will blend smoothly and cooperate properly with the active or front surface of the mouldboard 14 when the plowshare has been attached thereto with the aid of the bolts 15.

During normal operation and use of the improved plowshare, the combined plow is normally advanced along the ground in line with the plane of the flange surface 18, and when the unitary blade 10 and point 12 are lowered into the soil, the point 12 will normally be disposed slightly beneath the bottom of the furrow produced by the blade edge 11 and will tend to gouge into the earth in advance of the mouldboards due to the convex formation of the upper surface 19. This gouging tendency is augmented or assisted by the convex upper blade surface portion 21 adjoining the furrow side of the advancing point 12 at the edge 11, so that hard earth crust and smaller stones will be elevated and loosened, and will not lift the plowshare out of its normal course. The straight blade edge 11 will thus be caused to travel along the bottom of the furrow in a substantially horizontal plane and will cut a smooth furrow of uniform depth, while the loosened earth will be effectively removed laterally from within the furrow by the concave surfaces 20, 22, 23 of the plowshare and by the mouldboard 14. In this manner, successive uniform furrows may be rapidly and effectively produced, and the edge 11 may be conveniently re-sharpened without interference by the point 12 due to the provision of the clearance recess 24.

From the foregoing detailed description, it will be apparent that my present invention provides a simple but durable plowshare which is highly efficient in use, and is adapted to automatically maintain the desired position within the ground so as to resist lifting tendency which might otherwise result in the production of non-uniform furrows. The improved device may obviously be readily constructed and applied to a standard mouldboard 14 or other suitable carrier, and has proven highly satisfactory and successful in actual use especially under adverse plowing conditions prevailing due to the presence of unduly hard surface soil and numerous small stones. The improved formation of the point 12 and of the blade 10 positively insures the production of clean furrows of uniform dimensions having a smooth land side cut, by virtue of the omission of side cutting edges on the furrow side of the point, and the improved plowshare may also be propelled through the ground with minimum power consumption due to its improved formation.

It should be understood that it is not desired to limit this invention to the exact details of construction and to the precise mode of operation, herein shown and described, for various modifications within the scope of the appended claims may occur to persons skilled in the art.

I claim:

1. A plowshare comprising, a leading point having an approximately plane land side guiding surface and a lower front cutting edge disposed approximately perpendicular to said surface, and a blade extending laterally away from said point at an oblique angle and having a straight lower cutting edge adapted to travel in a plane above said point edge, both said blade and said point having convex upper surfaces adjoining said edges adjacent to said point and said blade having a concave upper surface directly adjoining its straight cutting edge remote from the point.

2. A plowshare comprising, a leading point having a flat land side guiding surface and a lower front cutting edge disposed normal to said surface, the opposite side of said point being devoid of cutting edges and the top thereof being convexly curved adjoining said front edge, and a blade extending away from said point surftce at an oblique angle and having a rectilinear lower cutting edge adapted to travel in a plane above said point edge, said blade having a convex upper surface adjoining said rectilinear edge adjacent to said point and having a concave upper surface directly adjoining said rectilinear cutting edge remote from said point.

3. A plowshare comprising, a leading point having a plane vertical land side guiding surface and a lower front cutting edge and being devoid of cutting edges at its furrow side, and a blade extending laterally away from said point at an oblique angle relative to said surface and having a straight lower cutting edge adapted to travel in a horizontal plane above said point edge, both said blade and said edges having convex upper and concave lower surfaces directly adjoining said edges adjacent to the point and said blade having a concave upper and a convex bottom surface adjoining its straight lower edge remote from the point.

EDWARD R. MOSSAK.

REFERENCES CITED

The following references are of record in the file of this patent:

UNITED STATES PATENTS

| Number | Name | Date |
| --- | --- | --- |
| 877,359 | McWane | Jan. 21, 1908 |
| 1,727,648 | Jarvis | Sept. 10, 1929 |